United States Patent
D'Souza

(10) Patent No.: US 7,072,332 B2
(45) Date of Patent: Jul. 4, 2006

(54) SOFT SWITCH USING DISTRIBUTED FIREWALLS FOR LOAD SHARING VOICE-OVER-IP TRAFFIC IN AN IP NETWORK

(75) Inventor: Maurice G. D'Souza, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 962 days.

(21) Appl. No.: 10/085,926

(22) Filed: Feb. 28, 2002

(65) Prior Publication Data

US 2003/0058839 A1 Mar. 27, 2003

Related U.S. Application Data

(60) Provisional application No. 60/325,247, filed on Sep. 27, 2001.

(51) Int. Cl.
*H04L 12/66* (2006.01)

(52) U.S. Cl. ........................ 370/352; 370/401
(58) Field of Classification Search ........... 370/352, 370/389, 401, 395; 709/223, 203, 246, 238, 709/230, 249; 713/150
See application file for complete search history.

(56) References Cited

U.S. PATENT DOCUMENTS

| | | | |
|---|---|---|---|
| 2003/0152067 A1* | 8/2003 | Richmond et al. | 370/352 |
| 2004/0044891 A1* | 3/2004 | Hanzlik et al. | 713/150 |
| 2004/0128398 A1* | 7/2004 | Pettey | 709/249 |

* cited by examiner

*Primary Examiner*—Chi Pham
*Assistant Examiner*—Prenell Jones

(57) ABSTRACT

A switch capable of handling voice-over-IP (VoIP) traffic between calling devices and called devices. The switch comprises: 1) call application nodes for executing call process server applications, wherein a first call process server application and a similar second call process server application form a first load sharing group server application; and 2) network address translation nodes for executing firewall server applications. A first firewall server application executed on a first network address translation node is associated with a similar second firewall server application executed on a second network address translation nodes separate from the first network address translation node. The first and second firewall server applications form a second load sharing group server application. The second load sharing group server application receives VoIP traffic and selects one of the first and second firewall server applications to verify that the VoIP traffic is authorized to access at least one of the call process server applications in the call application nodes according to a load distribution algorithm.

24 Claims, 3 Drawing Sheets

SOFT SWITCH USING DISTRIBUTED FIREWALLS FOR LOAD SHARING VOICE-OVER-IP TRAFFIC IN AN IP NETWORK

The present invention claims priority to U.S. Provisional Application Ser. No. 60/325,247, which was filed on Sep. 27, 2001.

CROSS-REFERENCE TO RELATED APPLICATIONS

The present invention is related to those disclosed in the following U.S. Non-Provisional Patent Applications:
1) [Ser. No. 10/038,878], filed Dec. 31, 2001, entitled "SYSTEM AND METHOD FOR DISTRIBUTED CALL PROCESSING USING LOAD SHARING GROUPS;"
2) [Ser. No. 10/039,186], filed Dec. 31, 2001, entitled "SYSTEM AND METHOD FOR DISTRIBUTED CALL PROCESSING USING A DISTRIBUTED TRUNK IDLE LIST;"
3) [Ser. No. 10/038,872], filed Dec. 31, 2001, entitled "DISTRIBUTED IDENTITY SERVER FOR USE IN A TELECOMMUNICATION SWITCH;" and
4) [Ser. No. 10/038,879], filed Dec. 31, 2001, entitled "SYSTEM AND METHOD FOR PROVIDING A SUBSCRIBER DATABASE USING GROUP SERVICES IN A TELECOMMUNICATION SYSTEM."

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to telecommunication systems and, more specifically, to a switch that uses a distributed firewall to provide load sharing of voice-over-IP (VoIP) traffic.

BACKGROUND OF THE INVENTION

Telecommunications providers continually try to create new markets and to expand existing markets for telecommunication services and equipment. One important way to accomplish this is to improve the performance of telecommunication network equipment while making the equipment cheaper and more reliable. Doing this allows telecommunications providers to reduce infrastructure and operating costs while maintaining or even increasing the capacity of their networks. At the same time, the telecommunication service providers work to improve the quality of service and increase the quantity of services available to the end-user.

One type of telecommunication service that is becoming increasingly popular is voice-over-IP (VoIP). VoIP is an application that enables users to carry voice traffic (e.g., telephone calls, faxes, and other data) over an Internet Protocol (IP) network. A VoIP application segments the voice signals traffic into frames and stores them in voice packets. The voice packets are transported via the network using any conventional multimedia (i.e., voice, video, fax, and data) protocol. The protocols include H.323, IPDC, Media Gateway Control Protocol (MGCP), Session Initiation Protocol (SIP), Megaco, Session Description Protocol (SDP), and Skinny, among others. SIP and H.323 are particularly important for Internet telephones.

Session Initiation Protocol (SIP) is an application layer control signaling protocol for VoIP implementations using Redirect Mode. SIP is a textual client server base protocol that provides the necessary protocol mechanisms so that the end-user system and proxy servers can provide different services, including call forwarding, called and calling number identification, invitations for multicast conference, and basic automatic call distribution (ACD). SIP addresses (e.g., URLs) can be embedded in Web pages to provide simple "click to talk" service.

H.323 is an International Telephone Union (ITU-T) standard that includes a set of standards defining real-time multimedia communications for packet-based networks. H.323 defines a set of call control, channel setup, and codec specifications for transmitting real-time voice and video over networks that do not offer guaranteed service or quality of service. The networks may include packet networks, particularly the Internet, local area networks (LANs), wide area networks (WANs), and intranets.

The main benefits of VoIP are cost savings due to:
1) Voice and data travel across just one line into the home, or a single IP network into businesses;
2) Voice is transformed into digital packets and set directly to the Internet, completely bypassing the circuit switches or the telephone companies and their fees; and
3) IP networks use flexible "soft" switches that are much easier to upgrade with software. An IP telephony gateway takes up much less space than a circuit switch and has considerably lower power and cooling requirements.

Telecommunication soft switches typically employ a Network Address Translation (NAT) node/firewall node (FN) to protect the internal workings of a soft switch. The NAT/Firewall performs a network address translation function that provides a public IP address that is exposed to external packet networks. The NAT function translates the private IP addresses from the internal network to the public address and vice versa. The firewall functions may be one of several types, including packet filter, circuit gateway, application gateway or trusted gateway. A conventional firewall is implemented through a combination of hosts and routers. A router can control traffic at the packet level, allowing or denying packets based on the source or destination address of the port number. This technique is called packet filtering. A host can control traffic at the application level, allowing access control based on a more detailed and protocol-dependent examination of the traffic. The process that examines and forwards packet traffic is known as a proxy.

Unfortunately, conventional firewall systems provide these capabilities based on a pre-assigned work distribution. This relied on a static distribution of the load for calls originating from the IP network. Moreover, conventional firewall systems are limited when the soft switch is scaled to larger or smaller sizes. In the previous methods, scaling often involved statically changing configuration and required a shutdown.

Therefore, there is a need for improved firewall systems for use in telecommunications systems. In particular, there is a need for firewall systems that may be easily scaled to larger or smaller sizes. More particularly, there is a need for network firewalls that do not rely on a static distribution of the traffic load for calls originating from the IP network.

SUMMARY OF THE INVENTION

To address the above-discussed deficiencies of the prior art, it is a primary object of the present invention to provide a switch capable of handling voice-over-IP (VoIP) traffic between calling devices and called devices. According to an advantageous embodiment of the present invention, the switch comprises: 1) a plurality of call application nodes capable of executing call process server applications, wherein a first call process server application is executed on a first one of the plurality of call application nodes and is associated with a similar second call process server application executed on a second one of the plurality of call application nodes separate from the first call application node, the first and second call process server applications thereby forming a first load sharing group server application; and 2) a plurality of network address translation nodes capable of executing firewall server applications, wherein a first firewall server application is executed on a first one of the plurality of network address translation nodes and is associated with a similar second firewall server application executed on a second one of the plurality of network address translation nodes separate from the first network address translation node, the first and second firewall server applications thereby forming a second load sharing group server application, wherein VoIP traffic associated with VoIP calls is received by the second load sharing group server application and the second load sharing group server application selects one of the first and second firewall server applications to verify that the VoIP traffic is authorized to access at least one of the call process server applications in the call application nodes according to a load distribution algorithm.

According to one embodiment of the present invention, the load distribution algorithm distributes the VoIP traffic in an alternating manner between the first and second firewall server applications.

According to another embodiment of the present invention, the load distribution algorithm distributes the VoIP traffic according to a current traffic load of the first firewall server application and a current traffic load of the second firewall server application.

According to still another embodiment of the present invention, the load distribution algorithm distributes the VoIP traffic in order to maintain the current traffic load of the first firewall server application at a level substantially equal to the current traffic load of the second firewall server application.

According to yet another embodiment of the present invention, the first firewall server application comprises a first primary-backup group server application, wherein the first primary-backup group server application comprises a first primary firewall process executed on the first network address translation node and a first backup firewall process associated with the first primary firewall process.

According to a further embodiment of the present invention, the state information associated with the first primary firewall process is mirrored to the first backup firewall process associated with the first primary firewall process.

According to a still further embodiment of the present invention, the first backup firewall process resides on the first network address translation node.

According to a yet further embodiment of the present invention, the first backup firewall process resides on a network address translation node separate from the first network address translation node.

In one embodiment of the present invention, the second firewall server application comprises a second primary-backup group server application, wherein the second primary-backup group server application comprises a second primary firewall process executed on the second network address translation node and a second backup firewall process associated with the second primary firewall process.

In another embodiment of the present invention, the state information associated with the second primary firewall process is mirrored to the second backup firewall process associated with the second primary firewall process.

In still another embodiment of the present invention, the second backup firewall process resides on the second network address translation node.

In yet another embodiment of the present invention, the second backup firewall process resides on a call application node separate from the second network address translation node.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
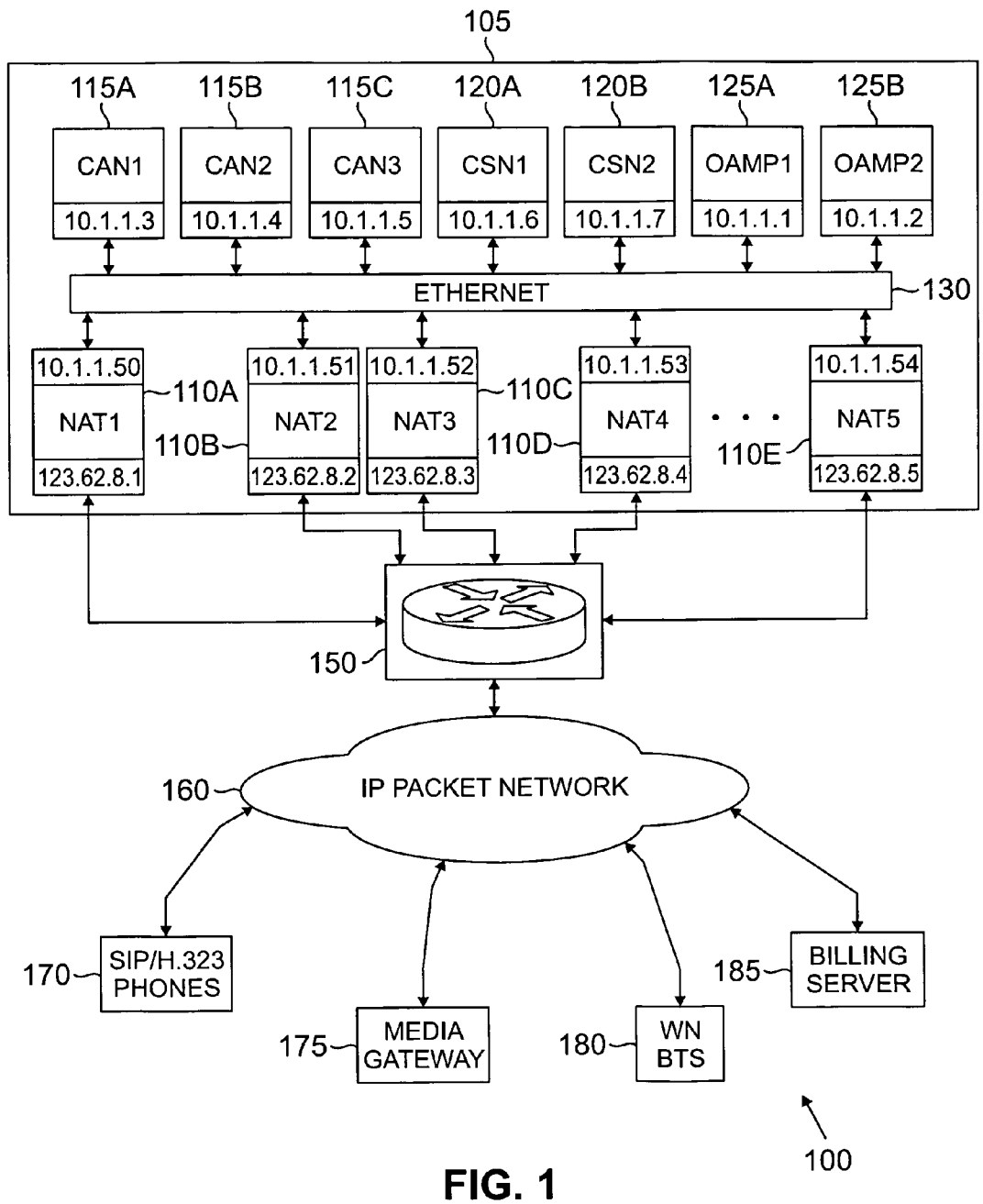
FIG. 1 illustrates an exemplary telecommunication network capable of implementing VoIP applications according to one embodiment of the present invention.
Figure 2:
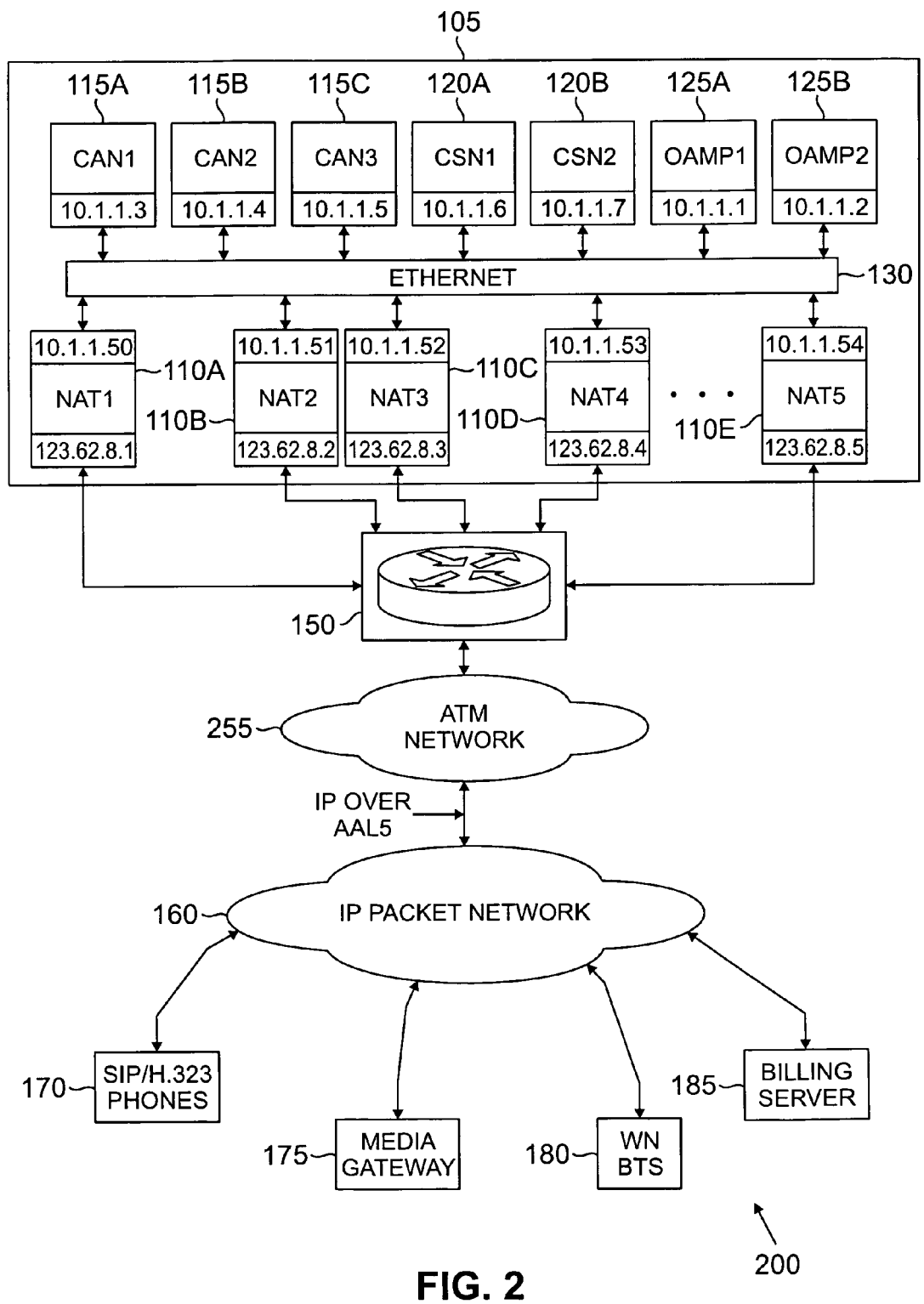
FIG. 2 illustrates an exemplary telecommunication network capable of implementing VoIP applications according to a second embodiment of the present invention.
Figure 3:
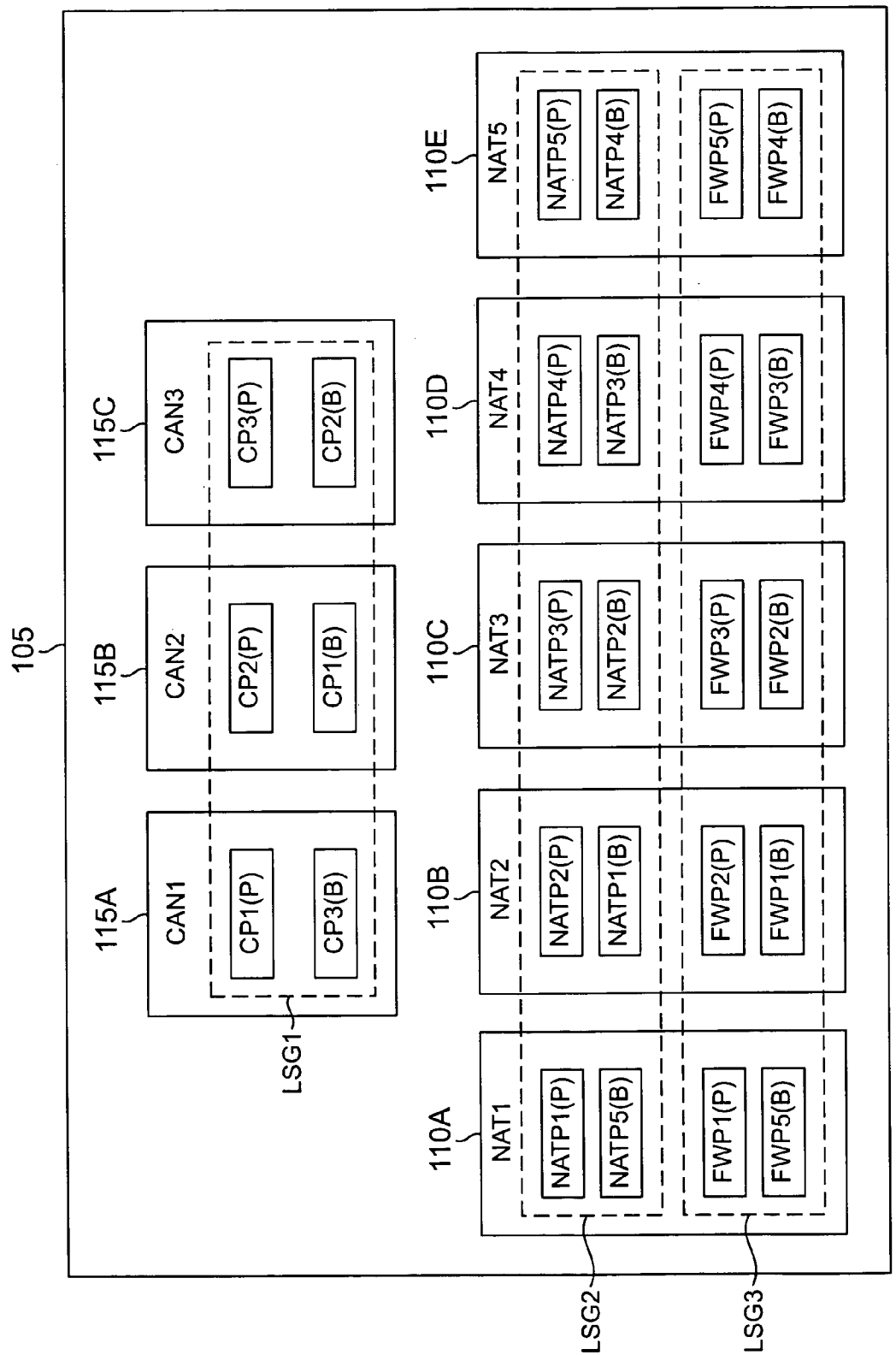
FIG. 3 illustrates selected portions of an exemplary soft switch in the telecommunication network capable of implementing network address translation functions and firewall functions as distributed load sharing groups to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunication network.

FIG. 1 illustrates exemplary telecommunication network 100 capable of implementing VoIP applications according to one embodiment of the present invention. Telecommunication network 100 comprises one or more soft switches 105, router 150, Internet Protocol (IP) packet network 160, one or more session initiation protocol (SIP)/H.323 phone(s) 170, media gateway 175, wireless network (WN) base transceiver subsystem (BTS) 180, and billing server 185. Soft switch 105 comprises call processing application nodes (CANs) 115A, 115B, and 115C (labeled CAN1, CAN2, and CAN3, respectively), communication server nodes (CSNs) 120A, and 120B (labeled CSN1 and CSN2, respectively), operation, administration, maintenance and provisioning (OAMP) modes 125A and 125B (labeled OAMP1 and OAMP2, respectively), and network address translation (NAT) and firewall nodes 110A, 110B, 110C, 110D, and 110E (labeled NAT1, NAT2, NAT3, NAT4, and NAT5, respectively). CAN1–CAN3, CSN1 and CSN2, OAMP1 and OAMP2, and NAT1–NAT5 are coupled by, and communicate across, internal Ethernet 130.

Soft switch 105 and other similar soft switches (not shown) provides switching and other services to SIP/H.323 phones 170, media gateway 175, WN BTS 180, and billing server 185. These services may include phone-to-phone, phone-to-PC, fax-to-e-mail, e-mail-to-fax, fax-to-fax, call center applications, VPN, IP phone, and the like. Media gateway 175 converts media (i.e., voice, video, audio, fax) provided in one type of network (i.e., publicly switched telephone network (PSTN)) to the format required for the VoIP network in switch 105. For example, media gateway 175 may terminate bearer channels from a switched circuit network (e.g., SS7) and media streams from a packet network. SIP/H.323 phones 170 are able to place calls to, and receive calls from, other SIP/H.323 phones via soft switch 105. Also, SIP/H.323 phones 170 are able to place calls to, and receive calls from, phones connected to the public switched phone network (PSTN) (not shown) coupled to media gateway 175 via soft switch 105. Furthermore, SIP/H.323 phones 170 are able to place calls to, and receive calls from, wireless phones and other wireless access terminals communicating with wireless network BTS 180 via soft switch 105.

Call application nodes 115A, 115B, and 115C (CAN1–CAN3) execute a number of call process (CP) server applications organized as primary and backup processes that are available as distributed group services to SIP/H.323 phone(s) 170, media gateway 175, wireless network base transceiver subsystem 180, and billing server 185. The call application nodes are separate computing nodes comprising a processor and memory that provide scalability and redundancy by the simple addition of more call application nodes, up to a maximum of N nodes.

Each of the call processes executed on CAN1–CAN3 handles the control signals and messages transmitted to or received from SIP/H.323 phones 170, media gateway 175, WN ETS 180, and billing server 185. Each of SIP/H.323 phones 170, media gateway 175, WN BTS 180, and billing server 185 establishes a session with a load sharing group, which assigns each call to a particular one of the primary-backup group call process server applications executed on CAN1–CAN3. The selected call process server application actually performs the call process services/functions requested by the call process client application.

Similarly, NAT1–NAT5 execute a number of network address translation and firewall applications organized as primary and backup processes that are available as distributed (i.e., load sharing) group services to SIP/H.323 phone(s) 170, media gateway 175, wireless network base transceiver subsystem 180, and billing server 185. Communications server nodes 120A and 120B (CSN1 and CSN2) terminate SS7 links and handle MTP layers 1–3. CSN1 and CSN2 may also be organized as primary and backup processes that are available as distributed (i.e., load sharing) group services.

FIG. 3 illustrates selected portions of exemplary soft switch 105 in telecommunication network 100 capable of implementing network address translation functions and firewall functions as distributed load sharing groups using group services according to the principles of the present invention. In the illustrated embodiment, three exemplary call process server applications are being executed, namely CP1, CP2, and CP3. Each of these processes exists as a primary-backup group. Thus, CP1 exists as a primary process, CP1(P), and a backup process, CP1(B). Similarly, CP2 exists as a primary process, CP2(P), and a backup process, CP2(B), and CP3 exists as a primary process, CP3(P), and a backup process, CP3(B).

In the illustrated embodiment, CP1(P) and CP1(B) reside on different call application nodes (i.e., CAN1 and CAN2). This is not a strict requirement: CP1(P) and CP1(B) may reside on the same call application node (e.g., CAN1) and still provide reliability and redundancy for software failures of the primary process, CP1(P). However, in a preferred embodiment of the present invention, the primary process and the backup process reside on different call application nodes, thereby providing hardware redundancy as well as software redundancy. Thus, CP1(P) and CP1(B) reside on CAN1 and CAN2, CP2(P) and CP2(B) reside on CAN2 and CAN3, and CP3(P) and CP3(B) reside on CAN3 and CAN1. Together, CP1, CP2 and CP3 form a supergroup for load sharing purposes. Thus, CP1(P) and CP1(B), CP2(P) and CP2(B), and CP3(P) and CP3(B) are part of a first load sharing group (LSG1), indicated by the dotted line boundary.

Similarly, five exemplary network address translation process (NATP) server applications are being executed, namely NATP1, NATP2, NATP3, NATP4, and NATP5. Each of these processes exists as a primary-backup group. Thus, NATP1 exists as a primary process, NATP1(P), and a backup process, NATP1(B). Similarly, NATP2 exists as a primary process, NATP2(P), and a backup process, NATP2(B), NATP3 exists as a primary process, NATP3(P), and a backup process, NATP3(B), NATP4 exists as a primary process, NATP4(P), and a backup process, NATP4(B), and NATP5 exists as a primary process, NATP5(P), and a backup process, NATP5(B).

Again, in a preferred embodiment of the present invention, the primary NAT process and the backup NAT process reside on different network address translation nodes (i.e., NAT1–NAT5), thereby providing hardware redundancy as well as software redundancy. NATP1(P) and NATP1(B) reside on NAT1 and NAT2, NATP2(P) and NATP2(B) reside on NAT2 and NAT3, NATP3(P) and NATP3(B) reside on NAT3 and NAT4, NATP4(P) and NATP4(B) reside on NAT4 and NAT5, and NATP5(P) and NATP5(B) reside on NAT5 and NAT1. Together, NATP1, NATP2, NATP3, NATP4, and NATP5 form a supergroup for load sharing purposes. Thus, NATP1(P) and NATP1(B), NATP2(P) and NATP2(B), NATP3(P) and NATP3(B), NATP4(P) and NATP4(B), and NATP5(P) and NATP5(B) are part of a second load sharing group (LSG2), indicated by the dotted line boundary.

Finally, five exemplary firewall process (FWP) server applications are being executed, namely FWP1, FWP2, FWP3, FWP4, and FWP5. Each of these processes exists as a primary-backup group. Thus, FWP1 exists as a primary process, FWP1(P), and a backup process, FWP1(B). Similarly, FWP2 exists as a primary process, FWP2(P), and a backup process, FWP2(B), FWP3 exists as a primary process, FWP3(P), and a backup process, FWP3(B), FWP4 exists as a primary process, FWP4(P), and a backup process, FWP4(B), and FWP5 exists as a primary process, FWP5(P), and a backup process, FWP5(B).

FWP1(P) and FWP1(B) reside on NAT1 and NAT2, FWP2(P) and FWP2(B) reside on NAT2 and NAT3, FWP3(P) and FWP3(B) reside on NAT3 and NAT4, FWP4(P) and FWP4(B) reside on NAT4 and NAT5, and FWP5(P) and FWP5(B) reside on NAT5 and NAT1. Together, FWP1, FWP2, FWP3, FWP4, and FWP5 form a supergroup for load sharing purposes. Thus, FWP1(P) and FWP1(B), FWP2(P) and FWP2(B), FWP3(P) and FWP3(B), FWP4(P) and FWP4(B), and FWP5(P) and FWP5(B) are part of a third load sharing group (LSG3), indicated by the dotted line boundary.

A group service provides a framework for organizing a group of distributed software objects in a computing network. Each software object provides a service (e.g., network address translation or firewall protection). In addition, the group service framework provides enhanced behavior for determining group membership, deciding what actions to take in the presence of faults, and controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Server applications, such as CP1–CP3, NATP1–NATP5, and FWP1–FWP5, provide services that are invoked by client applications, such as SIP/H.323 phones (170), media gateway 175, WN BTS 180, and billing server 185. As shown in FIG. 3, the server applications are organized into primary-backup groups configured as a 1+1 type of primary-backup group. There are multiple numbers of these primary-backup groups and the exact number is scalable according to the number of processes and/or computing nodes (CANs) and network address translation nodes (NAT1–NAT5) that are used. All of the primary-backup groups are themselves a member of a single load ifs sharing group (e.g., LSG1, LSG2, LSG3).

It is important to note that while the client applications, such as SIP/H.323 phones (170) and media gateway 175, are clients with respect to the server applications, CP1–CP3, NATP1–NATP5, and FWP1–FWP5, a server application may be a client with respect to another server application. In particular, the call process server applications CP1–CP3 may be clients with respect to the network address translation server applications NATP1–NATP5, and the firewall server applications, FWP1–FWP5.

A client application establishes an interface to the load sharing group. When a new call indication is received by the client application, the client application establishes a session with the load sharing group according to a client-side load sharing policy. The initial policy is round-robin (i.e., distribution of new calls from router 160 in sequential order to each one of NAT1–NAT5), but other policies may be used that take into account the actual loading of the different primary-backup groups.

The client application associates the session with the new call and sends messages associated with the call over the session object. The client application also receives messages from the primary-backup group via the session established with the primary backup group. Only the primary process (e.g., NATP1(P)) of the lug primary-backup group joins the load sharing group (e.g., LSG2). For a variety of reasons, the application containing the primary may be removed from service. The server application may elect to not accept any new calls by leaving the load sharing group. However, the client applications may still maintain their session with the primary-backup group for existing calls. This action is taken because new call traffic may be lost if the singleton primary also fails. New calls are not distributed to the primary-backup group if it leaves the load sharing group.

If the primary of the primary-backup group that is a member of the load sharing group should fail, the backup member is informed that the primary member has failed (or left) and then assumes the role of primary member. The responsibility for these actions must be performed by the server application. It is the responsibility of the Group Service to inform the backup member that the primary member has failed or left.

FIG. 1 shows the loading sharing architecture for calls originating from IP packet network 160 or from, for example, an SS7 network connect to media gateway 175. Calls originating from IP packet network 160 are SIP/H.323 calls and calls from media gateway 175 may be MEGACO/MGCP notify messages. It is noted that CAN1–CAN3, CSN1 and CSN2, OAMP1 and OAMP2, and NAT1–NAT5 all have unique internal addresses on internal Ethernet 130. OAMP1 and OAMP2 have internal IP addresses 10.1.1.1 and 10.1.1.2, respectively. CAN1–CAN3 have internal IP addresses 10.1.1.3, 10.1.1.4, and 10.1.1.5, respectively. CSN1 and CSN2 have internal IP addresses 10.1.1.6 and 10.1.1.7, respectively. Finally, NAT1–NAT5 have internal IP addresses 10.1.1.50, 10.1.1.51, 10.1.1.52, 10.1.1.53, 10.1.1.54, respectively.

Additionally, each of NAT1–NAT5 has an external IP address that is seen by router 150. NAT1–NAT5 have external IP addresses 123.62.8.1, 123.62.8.2, 123.62.8.3, 123.62.8.4, and 123.62.8.5, respectively. The NAT server applications (NATP1–NATP5) in NAT1–NAT5 provide network address translation (NAT) and load sharing functions for all the IP call related protocols handled by soft switch 105, such as MGCP, SIP, H323, MEGACO. The network address translation functions provide public IP addresses that are exposed to external IP packet network 160 and performs the translation of the internal IP addresses from Ethernet network 130 to the public address, and vice versa. The firewall server applications (FWP1–FWP2) in NAT1–NAT5 control access to soft switch 105 for protocols such as TCP, UDP, FTP, HTTP, Telnet, and the like.

IP Call Distribution Mechanism

1) Packet calls—The NAT/firewall nodes provide a public IP address used by external devices to address soft switch 105.

2) SIP calls—All SIP messaging is addressed to the external IP addresses of NAT1–NAT5. In the NAT, there exists a thin SIP proxy application. The purpose of the thin proxy is to hide the internal IP structure of soft switch 105 and to achieve efficient load distribution among the call processing CANs. When an Invite message is received at the NAT on port 5060, the SIP stack on the NAT passes the message to the thin SIP proxy.

The job of the SIP proxy on each one of NAT1–NAT5 is to use group services to create a session ID correlated to the call ID received from the Invite message. The session ID is an internal marker that uniquely identifies a call within soft switch 105. It enables the proxy to direct call related messages to the primary process in one of CAN1–CAN3 handling the call by obtaining the session ID. Using the interface handler, the SIP proxy can then relay the message onto the primary call process as a SIP message encapsulated in a DTN wrapper. Replies to the SIP message are sent back to the proxy in the NAT that originated the message so that the external IP address may be represented in the outgoing response.

All Invite messages originating from soft switch 105 pass through the thin proxy so as to hide the internal addressing information. The thin proxies on the firewall node also are part of a load sharing group, so that when the originating primary process sends out the Invite message, it will first consult the load sharing client as to which proxy has the capacity to handle the outgoing call. The proxy does the necessary address replacement in the outgoing message and forwards the message to the destination. The same proxy can then handle all incoming messages.

3) H.323 Calls—Similar to SIP calls, H.323 calls are addressed to NAT1–NAT5 from the external clients. The H.323 client in soft switch 105 only advertises a fixed number of ports on which it will receive Q.931 messages and another set of ports on which it will receive the H.245 messages. The service provider sets up the H.323 ports at subscription time. The ports can be set up in a gatekeeper, if one is being used, or as a default for each subscriber. Each call process in a load sharing group for H.323 supports a predetermined subset of the ports on which it receives H.245 messages.

When a SETUP message arrives at an NAT node, the H.323 thin proxy determines the location of the primary group member to handle the call after the LSC that determined the availability of the CP groups. The transaction is referenced by the call reference number in the Q.931 messages. Subsequent messaging to the group is determined by CRV (call reference value). Once the call has established the Q.931 call, the group uses one of its H.245 predetermined ports to open the logical channel to the external client. The thin proxy forwards that message on using the external IP address. Subsequent H.245 messages on that port are forwarded to the call process handling that call.

4) MGCP messaging—MGCP follows a similar strategy to the SIP outgoing calls. When a notify message is received from media gateway 175, the message can be routed to any of the available primary/backup processes. The primary process then can originate the CRCX and send it to the available proxy in a manner similar to that described in the SIP section. The correlation of the session ID in this case is made to the connection number and the endpoint/MG combination. On a reply back from media gateway 175, the message is routed to the primary backup group that is controlling the endpoint. Any subsequent Notify messages for an endpoint that is already in use is first load distributed to the primary/backup processes and if it is determined that it is being used the Notify message is forwarded to the primary/backup group that is controlling that endpoint.

According to an exemplary embodiment of the present invention, a domain name for soft switch 105 is advertised for each of the call processing types. For example, SIP, MGCP and H.323 call processing may be addressed as "sip.domainname.com" and "mgcp.domainname.com" and "h323.domainname.com", respectively. A DNS server resolves these names to IP addresses and provides primitive load distribution normally in a round robin fashion. An alternative to the domain name would be to advertise a single IP address of router 150, which is located between the NAT/firewalls and external IP packet network 160. Router 160 is then set up to distribute the messages across NAT1–NAT5 in a round robin manner.

The firewall and NAT proxy processes on NAT1–NAT5 run as a load sharing group. The CP processes, for outgoing legs of a call, use a load sharing client to determine which firewall to go to. If the firewall receives a message from the external network and cannot correlate it to any session ID in its load sharing client, it then uses the multicast capability from DTN to multicast to the rest of the firewalls. The firewall that handled that call then processes that message. If no firewall knows about the call, the message is dropped.

FIG. 1 shows the connection of soft switch 105, whose domain name is advertised, to a native IP network. When addressed by the domain name by external entities, such as SIP phones, Media it gateways, and the like, the domain name is translated to an external IP address registered by the NAT/firewalls (i.e., NAT1–NAT5). The balancing of the loads to the NAT1–NAT5 is done at the DNS server utilizing a round robin algorithm. The number of NATs required is scalable by the messaging traffic loads expected.

FIG. 2 illustrates exemplary telecommunication network 200 capable of implementing VoIP applications according to a second embodiment of the present invention. Telecommunication network 100 is similar to telecommunication network 100 in most respects. However, FIG. 2 shows the connection of soft switch 105, whose domain name is advertised, to external IP packet network 160 over asynchronous transfer mode (ATM) network 255. The router with the DNS capability is the egress point of ATM network 255 where IP is carried over ATM Adaptation layer type 5 (AAL5). The NAT/firewalls in this depiction only have IP connections. When addressed by a domain name by external entities such as SIP phones, media gateways, and the like, the domain name is translated to an external IP address registered by the NAT/firewalls. The balancing of the load to the NAT1–NAT5 is done at the DNS server utilizing a round robin algorithm. The number of NATs required is scaleable by the messaging traffic loads expected. In alternate embodiments of the present invention, NAT1–NAT5 may be directly connected to ATM network 255. The DNS service is performed either at the ingress point or somewhere within ATM network 255.

Details of SIP Application Proxy

Basic architecture statements:

1) Router 150 is addressed as a domain name of soft switch 105 and an IP address which will be considered to be the IP address of soft switch 105.

2) The maintenance and configuration of router 150 is done separate from the OAMP functions of soft switch 105.

3) Router 150 may employ other methods of load distribution besides round-robin. The load sharing (or distribution) algorithm is configurable through the maintenance interface of router 150.

4) Each one of NAT1–NAT5 contains a proxy process which is capable of looking into a SIP message and extracting from it a callId.

5) The proxy process on NAT1–NAT5 runs as a primary/backup group, with the backup on another node.

6) NAT1–NAT5 use the callID on the incoming INVITE messages to create a SessionID and associate that session with a primary/backup call process (CP) process group chosen through a distribution algorithm.

7) Any SIP message received from external IP packet network 160 at NAT1–NAT5 is extracted from the IP transport and repackaged into DTN transport to be relayed to the primary/backup call process server application.

8) The CP primary process uses an internal stack to decode the SIP message.

9) The CP primary process formats the outbound SIP Invite messages and uses a LSG to choose which one of NAT1–NAT5 to send it through.

10) The CP primary process relays all outbound SIP messages to the appropriate one of NAT1–NAT5 using Group Services transport.

11) NAT1–NAT5 may manipulate the header information to point to itself as the final point before sending the message out to external IP packet network 160.

12) All the load sharing groups (LSGs) that run in CAN1–CAN3 and NAT1–NAT5 get notified when the appropriate primary/backup processes enter or leave the respective load sharing groups.

13) The LSG deletes the sessions once the call has been terminated, either normally or abnormally.

IP address Manipulation at the Firewall

When a SIP INVITE is received from the external network, it adds the contact header field to the responses it sends back, when it sends out an INVITE it also adds a contact header field to the message as well as the ACK to the final response. It also adds a VIA field to reflect its own IP address in addition to soft switch 105 domain name.

When a request message is received at one of NAT1–NAT5, the firewall server application finds the available primary/backup group that is able to process the messages and forwards the message to that primary backup group via Group Services. On the response, each one of NAT1–NAT5 adds its IP address to the VIA field and the Contact Header.

For outbound requests, the primary/backup group select one of NAT1–NAT5 to go to based on the proxy load sharing client and sends the request to that node within a Group Services message. Each one of NAT1–NAT5 then adds its IP address to the VIA and Contact Header fields, so that all responses may be directed back to the correct one of NAT1–NAT5.

Primary/Backup Failure of the Proxy at the Firewall

As noted above, each proxy process runs as a primary/backup group. The backup process should always run in a processor that is not running its own primary. Although a duplex processor failure is possible, it is highly improbable and in the event it occurs it would indicate a bigger problem in the network than that which could be resolved by a redundancy scheme. Therefore, in the case of a duplex failure of proxy, the firewall that receives the messages from the network will multicast the message to all CANs. Similarly if the CAN detects a duplex failure of the firewall proxy it will re-establish a sessionID for one of the other primary/backup groups and continue its processing. It may have to re-send some of the messages.

For messages outbound from the CAN to the external network, a primary proxy failure will cause the messages to be routed through the backup. The backup process will do the SIP header manipulation as described above. For inbound messages, a failure of the primary proxy process will cause the backup process to send a message to all sessions in the LSG to resend all the messages for which the CP process is awaiting a response. This allows the backup process to manipulate the header information and resend the message to the far end.

Alternatively, if a processor failure occurs at one of NAT1NAT5, the external router can be informed to redirect the traffic to the next IP address on the list. When the message arrives at that NAT, if it does not find an association between the callID and the sessions in the LSC table, it will multicast the message to the rest of the proxies on the rest of the NATs and the primary that has knowledge of the sessionID handles the message.

Once a primary process has stopped and control is passed on to a backup process in another processor that already hosts a primary, the backup process will take itself out of the load sharing group to receive new calls and will just handle the calls it is processing before going into a dormant state or exiting. Once a new primary proxy is re-established as a sole process on a NAT then it can rejoin the group to receive calls.

Primary/Backup Failure of the CP Processes at the CAN

All the CP processes in the CANs run as part of a primary/backup pair and also part of the load sharing group. When a primary process dies, its backup becomes the primary. Group Services redirects all messages destined for that primary/backup pair to the new primary (old backup). Thus, in the firewall/NAT proxy, all messages related to a session for a particular primary/backup group get directed to the correct process.

Addition/Subtraction of CANs/NAT on the Same Load

As described above, any time a new CAN is added to soft switch 105 and the call processing process is started on that CAN, the call processing primary joins the call processing load sharing group. Each load sharing client is informed of the new addition to the load sharing group and adjusts its load distribution algorithm accordingly to include the new process. This might cause an initial imbalance in the distribution if a round-robin pattern is employed. However, this condition will be temporary as calls clear and new calls arrive.

Although the present invention has been described in detail, those skilled in the art should understand that they may make various changes, substitutions and alterations herein without departing from the spirit and scope of the invention in its broadest form.

What is claimed is:

1. A switch capable of handling voice-over-IP (VoIP) traffic between calling devices and called devices, said switch comprising:

a plurality of call application nodes capable of executing call process server applications, wherein a first call process server application is executed on a first one of said plurality of call application nodes and is associated with a similar second call process server application executed on a second one of said plurality of call application nodes separate from said first call application node, said first and second call process server applications thereby forming a first load sharing group server application; and a plurality of network address translation nodes capable of executing firewall server applications, wherein a first firewall server application is executed on a first one of said plurality of network address translation nodes and is associated with a similar second firewall server application executed on a second one of said plurality of network address translation nodes separate from said first network address translation node, said first and second firewall server applications thereby forming a second load sharing group server application, wherein VoIP traffic associated with VoIP calls is received by said second load sharing group server application and said second load sharing group server application selects one of said first and second firewall server applications to verify that said VoIP traffic is authorized to access at least one of said call process server applications in said call application nodes according to a load distribution algorithm.

2. The switch as set forth in claim 1 wherein said load distribution algorithm distributes said VoIP traffic in an alternating manner between said first and second firewall server applications.

3. The switch as set forth in claim 1 wherein said load distribution algorithm distributes said VoIP traffic according to a current traffic load of said first firewall server application and a current traffic load of said second firewall server application.

4. The switch as set forth in claim 3 wherein said load distribution algorithm distributes said VoIP traffic in order to maintain said current traffic load of said first firewall server application at a level substantially equal to said current traffic load of said second firewall server application.

5. The switch as set forth in claim 1 wherein said first firewall server application comprises a first primary-backup group server application, wherein said first primary-backup group server application comprises a first primary firewall process executed on said first network address translation node and a first backup firewall process associated with said first primary firewall process.

6. The switch as set forth in claim 5 wherein state information associated with said first primary firewall process is mirrored to said first backup firewall process associated with said first primary firewall process.

7. The switch as set forth in claim 6 wherein said first backup firewall process resides on said first network address translation node.

8. The switch as set forth in claim 6 wherein said first backup firewall process resides on a network address translation node separate from said first network address translation node.

9. The switch as set forth in claim 1 wherein said second firewall server application comprises a second primary-backup group server application, wherein said second primary-backup group server application comprises a second primary firewall process executed on said second network address translation node and a second backup firewall process associated with said second primary firewall process.

10. The switch as set forth in claim 9 wherein state information associated with said second primary firewall process is mirrored to said second backup firewall process associated with said second primary firewall process.

11. The switch as set forth in claim 10 wherein said second backup firewall process resides on said second network address translation node.

12. The switch as set forth in claim 10 wherein said second backup firewall process resides on a call application node separate from said second network address translation node.

13. A telecommunications network comprising:
a plurality of switches capable of handling voice-over-IP (VoIP) traffic between calling devices and called devices, each of said plurality of switches comprising:
a plurality of call application nodes capable of executing call process server applications, wherein a first call process server application is executed on a first one of said plurality of call application nodes and is associated with a similar second call process server application executed on a second one of said plurality of call application nodes separate from said first call application node, said first and second call process server applications thereby forming a first load sharing group server application; and
a plurality of network address translation nodes capable of executing firewall server applications, wherein a first firewall server application is executed on a first one of said plurality of network address translation nodes and is associated with a similar second firewall server application executed on a second one of said plurality of network address translation nodes separate from said first network address translation node, said first and second firewall server applications thereby forming a second load sharing group server application, wherein VoIP traffic associated with VoIP calls is received by said second load sharing group server application and said second load sharing group server application selects one of said first and second firewall server applications to verify that said VoIP traffic is authorized to access at least one of said call process server applications in said call application nodes according to a load distribution algorithm; and
an Internet protocol (IP) packet network for interconnecting said plurality of switches; and
at least one media gateway coupled to said IP packet network.

14. The telecommunications network as set forth in claim 13 wherein said load distribution algorithm distributes said VoIP traffic in an alternating manner between said first and second firewall server applications.

15. The telecommunications network as set forth in claim 13 wherein said load distribution algorithm distributes said VoIP traffic according to a current traffic load of said first firewall server application and a current traffic load of said second firewall server application.

16. The telecommunications network as set forth in claim 15 wherein said load distribution algorithm distributes said VoIP traffic in order to maintain said current traffic load of said first firewall server application at a level substantially equal to said current traffic load of said second firewall server application.

17. The telecommunications network as set forth in claim 13 wherein said first firewall server application comprises a first primary-backup group server application, wherein said first primary-backup group server application comprises a first primary firewall process executed on said first network address translation node and a first backup firewall process associated with said first primary firewall process.

18. The telecommunications network as set forth in claim 17 wherein state information associated with said first primary firewall process is mirrored to said first backup firewall process associated with said first primary firewall process.

19. The telecommunications network as set forth in claim 18 wherein said first backup firewall process resides on said first network address translation node.

20. The telecommunications network as set forth in claim 18 wherein said first backup firewall process resides on a network address translation node separate from said first network address translation node.

21. The telecommunications network as set forth in claim 13 wherein said second firewall server application comprises a second primary-backup group server application, wherein said second primary-backup group server application comprises a second primary firewall process executed on said second network address translation node and a second backup firewall process associated with said second primary firewall process.

22. The telecommunications network as set forth in claim 21 wherein state information associated with said second primary firewall process is mirrored to said second backup firewall process associated with said second primary firewall process.

23. The telecommunications network as set forth in claim 22 wherein said second backup firewall process resides on said second network address translation node.

24. The telecommunications network as set forth in claim 22 wherein said second backup firewall process resides on a call application node separate from said second network address translation node.

* * * * *

UNITED STATES PATENT AND TRADEMARK OFFICE
CERTIFICATE OF CORRECTION

PATENT NO.         : 7,072,332 B2
APPLICATION NO. : 10/085926
DATED              : July 4, 2006
INVENTOR(S)        : Maurice G. D'Souza Page 1 of 1

It is certified that error appears in the above-identified patent and that said Letters Patent is hereby corrected as shown below:

Column 5, line 66, delete "WN ETS 180" and replace with --WN BTS 180--;

Column 7, line 57, delete "ifs";

Column 8, line 15, delete "lug";

Column 10, line 28, delete "it".

Signed and Sealed this

Second Day of January, 2007

JON W. DUDAS
*Director of the United States Patent and Trademark Office*